United States Patent
Kaito

(10) Patent No.: US 7,135,690 B2
(45) Date of Patent: Nov. 14, 2006

(54) RADIATION IMAGE STORAGE PANEL

(75) Inventor: Ryouzou Kaito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 43 days.

(21) Appl. No.: 10/848,360

(22) Filed: May 19, 2004

(65) Prior Publication Data
US 2004/0232352 A1  Nov. 25, 2004

(30) Foreign Application Priority Data
May 19, 2003  (JP) .............................. 2003-140774

(51) Int. Cl.
G03B 42/08  (2006.01)
(52) U.S. Cl. .................... 250/484.4; 250/581
(58) Field of Classification Search ............. 250/484.4, 250/484.2, 483.1, 488.1, 580, 581, 582, 583, 250/584, 585, 586, 587, 484.3; 252/301.4 H
See application file for complete search history.

(56) References Cited

U.S. PATENT DOCUMENTS

| | | | | |
|---|---|---|---|---|
| 4,491,736 A | * | 1/1985 | Teraoka ................... 250/484.4 |
| 4,689,278 A | * | 8/1987 | Umemoto et al. .......... 428/690 |
| 4,999,515 A | * | 3/1991 | Nakamura et al. ....... 250/484.4 |
| 5,036,207 A | * | 7/1991 | Nakamura et al. ....... 250/484.4 |
| 6,713,776 B1 | * | 3/2004 | Takahashi ................... 250/582 |
| 6,852,357 B1 | * | 2/2005 | Isoda et al. ................... 427/70 |
| 2003/0186023 A1 | * | 10/2003 | Isoda et al. ................... 428/98 |

* cited by examiner

Primary Examiner—David Porta
Assistant Examiner—Faye Boosalis
(74) Attorney, Agent, or Firm—Sughrue Mion, PLLC

(57) ABSTRACT

A radiation image storage panel having a phosphor layer formed by a gas phase-accumulation method, in which the phosphor layer is made of an europium activated alkali metal halide stimulable phosphor (in which the alkali metal atom is Rb and/or Cs and the halogen is Cl, Br and/or I), and the phosphor layer gives off a stimulated emission whose afterglow at 0.24 millisecond observed after excitation with a stimulating light has an intensity of $1/10^{2.1}$ or less of a maximum intensity of the stimulated emission (the stimulated emission and afterglow is observed after the phosphor layer is exposed to radiation and then excited with the stimulating light).

7 Claims, 2 Drawing Sheets

RADIATION IMAGE STORAGE PANEL

FIELD OF THE INVENTION

The present invention relates to a radiation image storage panel employable in a radiation image recording and reproducing method which utilizes an energy-storing phosphor, and the invention also relates to a process for preparation of the storage panel.

BACKGROUND OF THE INVENTION

When exposed to radiation such as X-rays, an energy-storing phosphor (stimulable phosphor, which gives off stimulated emission) absorbs and stores a portion of the radiation energy. The phosphor then emits stimulated emission according to the level of the stored energy when exposed to electromagnetic wave such as visible or infra-red light (i.e., stimulating ray). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the panel with a stimulating ray such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) used in the radiation image recording and reproducing method has a basic structure comprising a support and a phosphor layer provided thereon. However, if the phosphor layer is self-supporting, the support may be omitted. Further, a protective film is normally provided on the free surface (surface not facing the support) of the phosphor layer to keep the phosphor layer from chemical deterioration or physical shock.

Phosphor layers of various kinds are known. Examples of the known phosphor layers include a phosphor layer comprising a binder and an energy-storing phosphor dispersed therein, a phosphor layer which is formed by a gas phase-accumulation method or by a firing method and which comprises agglomerate of an energy-storing phosphor without binder, and a phosphor layer comprising energy-storing phosphor agglomerate impregnated with a polymer material.

A variation of the radiation image recording and reproducing method is known. While an energy-storing phosphor of the storage panel used in the conventional type plays both roles of radiation-absorbing function and energy-storing function, those two functions are separated in the method. In the method, a radiation image storage panel comprising an energy-storing phosphor (which stores radiation energy) is used in combination with a phosphor screen comprising another phosphor (radiation-absorbing phosphor) which absorbs radiation and emits ultraviolet or visible light. The disclosed method comprises the steps of: causing the radiation-absorbing phosphor of the screen to absorb and convert radiation having passed through an object or having radiated from an object into ultraviolet or visible light; causing the energy-storing phosphor of the panel to store the energy of the converted light as radiation image information; sequentially scanning the panel with a stimulating ray to emit stimulated light; and photoelectrically detecting the emitted light to obtain electric image signals. The present invention can be also applied to the radiation image storage panel used in this type of the method.

The radiation image recording and reproducing method (or radiation image forming method) has various advantages as described above. Even so, however, it is still desired that the radiation image storage panel used in the method have as high sensitivity as possible and, at the same time, give a reproduced radiation image of high quality (in regard to sharpness and graininess).

In order to improve the sensitivity and the image quality, it is proposed that the phosphor layer of the storage panel be prepared by a gas phase-accumulation method such as vacuum vapor deposition or sputtering. The process of vacuum vapor deposition, for example, comprises the steps of: heating to vaporize an evaporation source comprising a phosphor or materials thereof by means of a resistance heater or an electron beam, and depositing and accumulating the vapor on a substrate such as a metal sheet to form a layer of the phosphor in the form of columnar crystals.

The phosphor layer formed by the gas phase-accumulation method contains no binder and consists of the phosphor only, and there are cracks among the prismatic crystals of the phosphor. Because of the cracks, the stimulating ray can stimulate the phosphor efficiently and the emitted light can be collected efficiently, too. Accordingly, a radiation image storage panel having the phosphor layer formed by the gas phase-accumulation method has high sensitivity. At the same time, since the cracks prevent the stimulating ray from diffusing parallel to the layer, the storage panel can give a reproduced image of high sharpness.

When excited with, for example, a stimulating ray, the phosphor layer of the panel gives off emission (stimulated emission) accompanied by afterglow, which is emitted from the phosphor layer consecutively after the stimulated emission. Since causing noises to lower the S/N ratio in reading the radiation image information, the afterglow is preferably made as weak as possible in consideration of the image quality such as sharpness. The afterglow of the phosphor is a serious problem particularly in the case where the emission from the panel is detected in a point-scan detecting system with a photomultiplier since the scanning speed in that case is very high.

JP-A-4-240600 discloses a process for preparation of a radiation image storage panel giving stimulated emission accompanied by a small amount of afterglow. In the process, a layer of alkali metal halide stimulable phosphor such as RbBr:Tl or matrix thereof is formed by a gas phase-accumulation method such as the vapor deposition process, and then is subjected to heat treatment under an atmosphere containing an activator and an oxygen compound.

JP-A-62-156191 discloses improvement of the stimulated emission afterglow. In the Publication, powdery alkali metal halide stimulable phosphor such as RbBr:Tl is fired together with an oxygen-containing compound, so that the obtained phosphor contains oxygen to give stimulated emission improved in the afterglow.

WO 01/03156A1 discloses a CsX:Eu stimulable phosphor and a phosphor screen comprising a phosphor layer formed by a gas phase-accumulation method. In the publication, a film comprising the CsX:Eu stimulable phosphor layer formed by the vapor-deposition process is excited with a ultraviolet light (wavelength: 280 nm), and thereby emitted instant emission is observed. The instant emission spectrum shown in the publication has a sharp emission peak at approx. 440 nm, but it is not clear whether another emission peak is observed at approx. 490 nm or not. The publication is silent with respect to a peak at approx. 490 nm.

SUMMARY OF THE INVENTION

An object of the present invention is to provide a radiation image storage panel giving a radiation image of high quality.

Another object of the invention is to provide a process for preparation of a radiation image storage panel giving stimulated emission accompanied by only a small amount of afterglow that the resultant radiation image has high quality.

The inventor has studied the afterglow of stimulated emission given off by a layer of europium activated alkali metal halide stimulable phosphor (in which the alkali metal atom is Rb and/or Cs and the halogen is Cl, Br and/or I) in a radiation image storage panel, and finally found how to produce a radiation image storage panel giving stimulated emission accompanied by a remarkably reduced amount of afterglow. It has been found that there is a relation between the amount of stimulated emission afterglow and the spectrum of ultraviolet light-excited emission (spontaneous emission). Namely, if the instant emission spectrum has a peak at approx. 440 nm (the stimulated emission spectrum also has a main peak at this wavelength, and the intensity of stimulated emission depends on this main peak) in a specific intensity based on the intensity of another peak at approx. 490 nm, the afterglow of stimulated emission is remarkably reduced. On the basis of this finding, the inventor has achieved the present invention. In addition, the inventor has found that the phosphor layer giving a reduced amount of stimulated emission afterglow can be obtained by the steps of: performing the vapor-deposition process under adequately controlled deposition conditions such as properly controlled partial pressure of oxygen in the vaporization atmosphere, and subjecting the deposited layer to a proper heat treatment.

The present invention resides in a radiation image storage panel comprising a phosphor layer formed by a gas phase-deposition method, wherein the phosphor layer comprises an europium activated alkali metal halide stimulable phosphor in which the alkali metal atom is selected from the group consisting of Rb and Cs and the halogen is selected from the group consisting of Cl, Br and I, and wherein the phosphor layer gives off a stimulated emission whose afterglow at 0.24 millisecond observed after excitation with a stimulating light has an intensity of $1/10^{2.1}$ or less of a maximum intensity of the stimulated emission, the stimulated emission and after-glow being observed after the phosphor layer is exposed to radiation and then excited with the stimulating light.

The term of "maximum intensity of the stimulated emission" here means the maximum intensity of the stimulated emission given off by the phosphor layer of the radiation image storage panel. In measuring the time-course of the stimulated emission, the maximum intensity is observed immediately after the phosphor layer having stored radiation energy is excited with a stimulating light. In consideration of a practical process for reading out the radiation image information (in view of a system and means for detecting the stimulated emission), the intensity of stimulated emission given off 0.24 millisecond after the excitation with the stimulating ray is completed (i.e., afterglow of stimulated emission) should be noticed in the invention. It is important for the afterglow to have a relatively weak intensity as compared with the maximum intensity of the stimulated emission.

The invention also resides in a process for preparation of a radiation image storage panel, comprising a step in which at least one evaporation source containing an europium activated alkali metal halide stimulable phosphor in which the alkali metal atom is selected from the group consisting of Rb and Cs and the halogen is selected from the group consisting of Cl, Br, and I or starting materials thereof is heated, vaporized and deposited on a substrate to form a phosphor layer, wherein the evaporation source contains an europium component of the phosphor in an amount of $1.0 \times 10^{-4}$ to 1.0 mol based on one mol of an alkali metal halide component, the step of vaporization and deposition is performed at an oxygen partial pressure in the range of $5.0 \times 10^{-4}$ to $5.0 \times 10^{-2}$ Pa, and the formed layer is subjected to heat-treatment at 100 to 300° C. for 0.5 to 2 hours after the step of vaporization and deposition is complete.

PREFERRED EMBODIMENTS OF THE INVENTION

In the radiation image storage panel of the invention, the phosphor layer having been exposed to radiation gives off stimulated emission when excited with a stimulating ray. The stimulated emission afterglow emitted 0.24 millisecond (ms) after the excitation with the stimulating light preferably has an intensity of $1/10^{2.5}$ or less based on the intensity of the stimulated emission.

The phosphor layer of the storage panel of the invention gives an ultraviolet light-excited emission spectrum in which the intensities of emission peaks at approx. 440 nm and at approx. 490 nm are in the ratio I(440/490) satisfying the condition of, preferably I(440/490)≧10, more preferably I(440/490)≧14.

In the invention, the europium activated alkali metal halide stimulable phosphor is preferably represented by the following formula (I). In the formula (I), $M^I$ and X are preferably Cs and Br, respectively.

$$M^I X \cdot aM^{II}X'_2 \cdot bM^{III}X''_3 : zEu \qquad (I)$$

[in which $M^I$ is at least one alkali metal selected from the group consisting of Rb and Cs; $M^{II}$ is at least one alkaline earth metal or divalent metal selected from the group consisting of Be, Mg, Ca, Sr, Ba, Ni, Cu, Zn, and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga, and In; each of X, X' and X" is independently at least one halogen selected from the group consisting of Cl, Br and I; and a, b and z are numbers satisfying the conditions of 0≦a<0.5, 0≦b<0.5 and $1 \times 10^{-5} \leq z < 1 \times 10^{-1}$, respectively].

The radiation image storage panel of the invention is explained below in detail with the attached drawings referred to.

Figure 1:
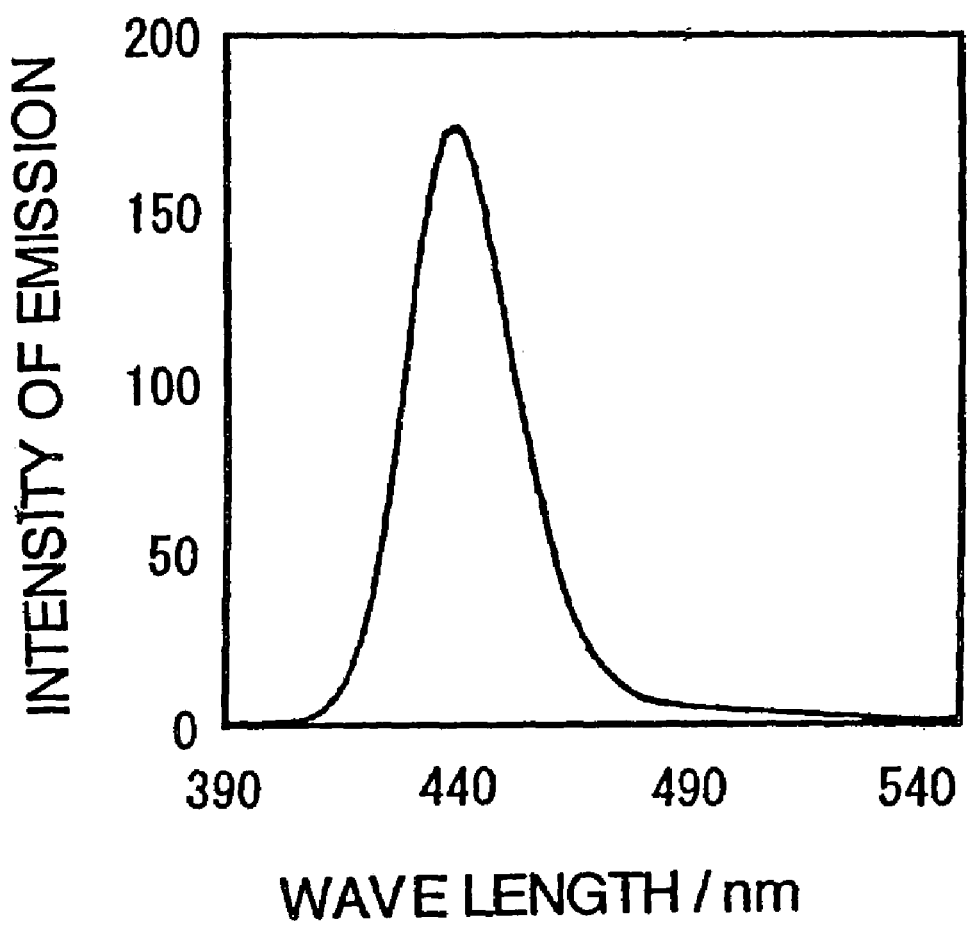
FIG. 1 shows an ultraviolet light excited-emission spectrum given by a phosphor layer in a radiation image storage panel of the invention.

FIG. 1 shows an ultraviolet light (wavelength: 345 nm) excited-spontaneous emission spectrum given by a phosphor layer in a radiation image storage panel of the invention (prepared in Example 1 described later) which comprises a support and a CsBr:Eu stimulable phosphor formed by the vapor-deposition process.

The ultraviolet light excited-emission spectrum of FIG. 1 comprises two emission peaks at approx. 440 nm and at approx. 490 nm. It is presumed that these emission peaks are attributed to the following different luminous components:

1) 440 nm: Eu-vacant lattice points
2) 490 nm: Eu aggregate.

The above-mentioned phosphor layer gives a stimulated emission spectrum (primary stimulating radiation: X-rays, secondary stimulating light: 633 nm) in which stimulated emission of CsBr:Eu (an emission peak) attributed to Eu-vacant lattice points is observed at approx. 440 nm.

Generally, in the case where a layer of $M^I X$:Eu (in which $M^I$ and X are an alkali metal and a halogen, respectively) stimulable phosphor is formed by a gas phase-accumulation method such as the vapor deposition process, the activator Eu material and the matrix $M^I X$ material have such different vapor pressures that they cannot be evenly vaporized, and further the activator (divalent) Eu material and the matrix $M^I X$ material have such different valences that the activator Eu cannot be homogeneously dispersed in the matrix $M^I X$. Consequently, aggregate of Eu is liable to be formed. In the invention, Eu-vacant lattice points are formed much more than the aggregate of Eu in the gas phase-accumulated film of the phosphor layer, and thereby not only the stimulated emission is enhanced but also the afterglow of stimulated emission is reduced.

Accordingly, in an ultraviolet light-excited emission spectrum such as shown in FIG. 1 given by the radiation image storage panel of the invention, the intensities of emission peaks at approx. 440 nm and at approx. 490 nm are in the ratio I(440/490) preferably satisfying the condition of: $I(440/490) \geq 10$. If this is the case, the afterglow of stimulated emission given off by the phosphor layer is remarkably improved, namely, the intensity of the afterglow emitted 0.24 millisecond (ms) after the excitation is completed can be reduced to $\frac{1}{10^{2.1}}$ or less based on the maximum intensity of the stimulated emission.

The ratio I(440/490) more preferably satisfies the condition of $I(440/490) \geq 14$. If this is the case, the intensity of the afterglow emitted 0.24 millisecond (ms) after the excitation is complete can be reduced to $\frac{1}{10^{2.5}}$ or less based on the maximum intensity of the stimulated emission.

The intensity of each emission peak is an amount of light emitted at the wavelength where each emission peak is positioned, and corresponds to the height of each peak from the base line in the ultraviolet light-excited emission spectrum.

Generally, the emission at 440 nm (attributed to Eu-vacant lattice points) increases in accordance with increase of the Eu content in the phosphor layer, but changes are observed no more when the Eu content reaches approx. $2 \times 10^{-3}$ mol based on 1 mol of $M^I X$. In contrast, the emission at 490 nm (attributed to Eu aggregate) decreases in accordance with decrease of the Eu content. Further, the more the phosphor layer contains oxygen, the less the afterglow of stimulated emission is given off. Accordingly, the content of oxygen preferably is in the range of $1 \times 10^{-6}$ to $1 \times 10^{-1}$ mol based on 1 mol of $M^I X$.

As described above, a radiation image storage panel improved in the afterglow of stimulated emission can be prepared by, for example, the steps of: forming a phosphor layer by a gas phase-accumulation method in which material containing an increased amount of Eu component is used and the atmosphere contains a relatively high oxygen partial pressure, and then subjecting the formed layer to heating treatment. In the following description, the process for preparation of the radiation image storage panel of the invention is explained in detail, by way of example, in the case where the vapor deposition process, which is a process of the gas phase-accumulation method, is adopted.

The europium activated alkali metal halide stimulable phosphor used in the invention is preferably represented by the formula (I). From the viewpoint of enhancing the stimulated emission, the phosphor preferably contains at least Cs as $M^I$ and at least Br as X in the formula (I). From the viewpoint of reducing the after-glow of stimulated emission, the number z, which indicates the content of the activator Eu, preferably satisfies the condition of $1 \times 10^{-5} \leq z \leq 1 \times 10^{-2}$. The phosphor of the formula (I) may contain, if needed, additives of metal oxide such as aluminum oxide, silicon dioxide and zirconium oxide in an amount of 0.5 mol or less based on 1 mol of CsX.

A substrate on which the vapor is deposited is normally used as a support of the radiation image storage panel, and hence can be optionally selected from known materials conventionally used as a support of a storage panel. The substrate is preferably a sheet of quartz glass, sapphire glass; metal such as aluminum, iron, tin or chromium; or heat-resistant resin such as aramide. For improving the sensitivity or the image quality (e.g., sharpness and graininess), a conventional radiation image storage panel often has a light-reflecting layer containing a light reflecting material such as titanium dioxide or a light-absorbing layer containing a light-absorbing material such as carbon black. These auxiliary layers can be provided on the storage panel of the invention, according to the aim and the use. Further, in order to promote growth of the prismatic crystals, a great number of very small convexes or concaves may be provided on the substrate surface on which the vapor is deposited. If an auxiliary layer such as a subbing layer (adhesive layer), a light-reflecting layer or a light-absorbing layer is formed on the deposited-side surface of the substrate, the convexes or concaves may be provided on the surface of the auxiliary layer.

In the case where the phosphor layer (vapor-deposited film) is formed by multi-vapor deposition (co-deposition), at least two evaporation sources are used. One of the sources contains a matrix material of the above stimulable phosphor, and the other contains an activator material. The multi-vapor deposition is preferred because the vaporization rate of each source can be independently controlled even if the materials have very different vapor pressures. According to the composition of the desired phosphor, each source may consist of the matrix material or the activator material only or otherwise may be a mixture thereof with additives. Three or more sources may be used. For example, in addition to the above sources, an evaporation source containing additives may be used.

The matrix material of the phosphor may be either the matrix compound itself or a mixture of two or more substances that react with each other to produce the matrix compound. The activator material is generally a compound containing Eu, for example, Eu halide. The Eu-containing compound generally contains both $Eu^{2+}$ and $Eu^{3+}$, but the content of $Eu^{2+}$ is preferably 70% or more by molar ratio because the desired stimulated emission (or spontaneous emission) is emitted from the phosphor activated by $Eu^{2+}$. The Eu-containing compound is preferably represented by $EuX_m$ in which m is a number preferably satisfying the condition of $2.0 \leq m \leq 2.3$. Ideally the value of m should be 2.0, but if so, oxygen is liable to contaminate the compound. The compound is, therefore, practically stable when m is approximately 2.2.

In the invention, the content of the activator Eu material in the evaporation source preferably is in the range of $1.0 \times 10^{-4}$ to 1.0 mol, more preferably in the range of $5.0 \times 10^{-3}$ to $5.0 \times 10^{-1}$ mol based on one mol of the matrix material $M^I X$.

The evaporation source preferably has a water content of not more than 0.5 wt. %. For preventing the source from bumping, it is important to control the water content in the above low range particularly if the material of matrix or activator is a moisture-absorbing substance such as EuBr or CsBr. The materials are preferably dried by heating treatment at 100 to 300° C. under reduced pressure. Otherwise, the materials may be heated in dry atmosphere such as nitrogen gas atmosphere to melt at a temperature above the melting point for several minutes to several hours.

The evaporation source preferably has a relative density of preferably 80% to 98%, more preferably 90% to 96%. If the relative density is low (namely if the source is in the form of powder), the powder is often sprinkled during vaporization and/or the source is liable to be evaporated so unevenly that the deposited phosphor film (layer) has uneven thickness. Therefore, for ensuring stable evaporation and deposition, the relative density is preferably in the particular range. In order to control the density in the above range, generally the material in the form of powder is compressed at a pressure of 20 Mpa or more or otherwise is heated to melt at a temperature above the melting point to shape a tablet. The evaporation source, however, is not always required to be in the shape of a tablet.

The evaporation source, particularly the source containing the matrix material, contains impurities of alkali metal (alkali metals other than ones constituting the phosphor) preferably in a content of not more than 10 ppm and impurities of alkaline earth metal (alkaline earth metals other than ones constituting the phosphor) preferably in a content of not more than 1 ppm. Such preferred evaporation source can be prepared from materials containing little impurities. In this way, a deposited film contaminated with less impurities can be produced, and thus-produced film gives an increased amount of emission.

The evaporation sources and the substrate are placed in a vacuum evaporation-deposition apparatus. In the case where the evaporation is carried out by means of an electron beam, the apparatus is evacuated to give an inner pressure of $1 \times 10^{-5}$ to $1 \times 10^{-2}$ Pa. An inert gas such as Ar, Ne or $N_2$ gas may be introduced into the apparatus at an inner pressure of high vacuum kept. In the case where the resistance heating is adopted to perform the evaporation, the inner pressure is made a medium vacuum such as 0.1 to 2.0 Pa.

In order to reduce the afterglow of stimulated emission, the partial pressure of oxygen in the evaporation-deposition atmosphere is controlled preferably in the range of $5.0 \times 10^{-4}$ to $5.0 \times 10^{-2}$ Pa. As described later in the working examples, the oxygen partial pressure is determined by mass spectroscopy (mass filter). The oxygen partial pressure in the above range can be produced by the steps of, for example, sufficiently evacuating the apparatus by means of an exhaust system comprising a combination of a diffusion pump (or turbo molecular pump) and a cold trap (e.g., cryocoil, cryopanel, super trap) and then introducing inert gas into the apparatus until the inner pressure reaches the desired vacuum.

In the case where the electron beam are used to perform the evaporation, electron beams generated by two or more electron guns are individually applied onto the evaporation sources. The accelerating voltage of each electron beam preferably is in the range of 1.5 to 5.0 kV. By applying the electron beams, the evaporation sources of matrix and activator materials are heated, vaporized, reacted with each other to form the phosphor, which is then deposited on the substrate. In this step, the accelerating voltage of each electron beam may be adjusted to control the vaporization rate of each source. In the case where the resistance heating is adopted, electric current is supplied to a resistance heater provided on the apparatus, so that the sources of matrix and activator materials are heated, vaporized, reacted with each other to form the phosphor, which is deposited on the substrate. The deposition rate, which means how fast the formed phosphor is deposited and accumulated on the substrate, generally is in the range of 0.1 to 1,000 μm/minute, preferably in the range of 1 to 100 μm/minute. The application of the electron beam and/or the heating by means of the resistance heater may be repeated twice or more to form two or more phosphor layers. The substrate may be cooled or heated, if needed, during the vapor deposition process.

In the case where the phosphor layer is produced by mono-vapor deposition, only one evaporation source containing the above stimulable phosphor or a mixture of materials thereof is used. Otherwise, an evaporation source separately containing the matrix material and the activator material may be used (pseudo-single vapor deposition). In the evaporation source for pseudo-single vapor deposition, the matrix material and the activator material are separately placed perpendicularly to the direction in which the vapor comes out of the source (namely, placed parallel to the substrate). In the deposition process, one electron beam is applied onto the source with its applied area selected. The time for applying the beam onto the area in which the matrix material or the activator material resides is controlled so that a stimulable phosphor layer of even composition can be formed.

Before preparing the above deposited film (layer) of stimulable phosphor, another deposited film (layer) consisting of the phosphor matrix ($M^I X$) only may be before-hand formed. If so, the resulting phosphor layer is well crystallized. In the thus-formed layered films, the additives such as the activator contained in the phosphor-deposited film are diffused into the matrix-deposited film while they are heated during the deposition and/or during the heating treatment performed after the deposition, and consequently the interface between the films is not always clear.

After the deposition process, the deposited film is preferably subjected to heating treatment so as to disperse Eu aggregate. The heating treatment is carried out generally at a temperature of 100 to 300° C. for 0.5 to 3 hours, preferably at a temperature of 150 to 250° C. for 0.5 to 2 hours. The atmosphere of the treatment is an inert gas atmosphere or an atmosphere of inert gas containing a small amount of oxygen or hydrogen gas. Examples of the inert gas include Ar, Ne, and $N_2$ gases. The heating treatment may be carried out immediately after the deposited film is formed on the substrate in the apparatus, or otherwise it may be performed after the substrate on which the deposited film is formed is taken out of the apparatus.

Thus produced phosphor layer consists essentially of europium activated alkali metal halide stimulable phosphor in the form of columnar crystals grown almost parallel to the thickness direction, and it gives off stimulated emission accompanied by reduced afterglow. The phosphor layer contains no binder and consists of the stimulable phosphor only, and there are cracks among the prismatic crystals. The thickness of the phosphor layer is normally in the range of 50 to 1,000 μm, preferably in the range of 200 to 700 μm.

The gas phase-accumulation method employable in the invention is not restricted to the above-described processes, and various other known processes such as a sputtering process and a CVD process can be used.

It is not necessary for the substrate to be used as a support of the radiation image storage panel. For example, after formed on the substrate, the deposited film can be peeled from the substrate and then laminated on a support with an adhesive to prepare the phosphor layer. Otherwise, the support (substrate) may be omitted.

It is preferred to place a protective film on the surface of the phosphor layer, so as to ensure good handling of the storage panel in transportation and to avoid deterioration. The protective film preferably is transparent so as not to prevent the stimulating rays from coming in or not to prevent the emission from coming out. Further, for protecting the storage panel from chemical deterioration and physical damage, the protective film preferably is chemically stable, physically strong, and of high moisture proof.

The protective film can be provided by coating the stimulable phosphor layer with a solution in which an organic polymer such as cellulose derivatives, polymethyl methacrylate or fluororesins soluble in organic solvents is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film. Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film is generally in the range of about 0.1 to 20 μm if the film is made of polymer material or in the range of about 100 to 1,000 μm if the film is made of inorganic material such as glass.

For enhancing the resistance to stain, a fluororesin layer may be further provided on the protective film. The fluororesin layer can be form by coating the surface of the protective film with a solution in which a fluororesin is dissolved (or dispersed) in an organic solvent, and drying the applied solution. The fluororesin may be used singly, but a mixture of the fluororesin and a film-forming resin is normally employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 μm. For forming the fluororesin layer, additives such as a crosslinking agent, a film-hardening agent and an antiyellowing agent can be used. In particular, the crosslinking agent is advantageously employed to improve durability of the fluororesin layer.

Thus, a radiation image storage panel of the invention can be prepared. The storage panel of the invention may be in known various structures. For example, in order to improve the sharpness of the resultant image, at least one of the films (layers) may be colored with a colorant which does not absorb the stimulated emission but the stimulating light.

In the following examples, gases in the apparatus were measured by mass spectroscopy utilizing a remaining gas analyzer (mass filter, RGA200, available from Stanford Research System), to determine the oxygen partial pressure in the evaporation-deposition atmosphere.

EXAMPLE 1

As the evaporation source, a powdery mixture of CsBr and EuBr$_m$ (m is approx. 2.2, molar ratio of Eu/Cs=$1.0 \times 10^{-1}$) was prepared. Independently, a synthetic quartz substrate (support) was washed successively with an aqueous alkaline solution, purified water and IPA (isopropyl alcohol), and then mounted to a substrate holder in an evaporation apparatus. The above evaporation source was placed in a crucible, and the apparatus was then evacuated, so that the inner pressure was set at 0.5 Pa. The substrate and the evaporation source were placed at the interval of 10 cm. The substrate was then heated to 100° C. by means of a sheath heater placed on the back side (the opposite side to the evaporation source), so that CsBr:Eu stimulable phosphor was deposited and accumulated at the rate of 5.1 μm/minute. The partial pressure of $O_2$ in the evaporation-deposition atmosphere was $2.8 \times 10^{-2}$ Pa.

After the evaporation-deposition was complete, the inner pressure was returned to atmospheric pressure and then the substrate was taken out of the apparatus. On the substrate, a deposited film (thickness: approx. 400 μm, area: 10 cm×10 cm) consisting of columnar phosphor crystals aligned densely and perpendicularly was formed.

The substrate on which the deposited phosphor film was thus formed was then placed on a vacuum-heating apparatus. The apparatus was evacuated by means of a rotary pump to approx. 1 Pa, so that water adsorbed on the deposited film was removed. Successively, the substrate was heated at 200° C. for one hour in a nitrogen gas atmosphere, and cooled in vacuo and then taken out of the apparatus. Thus, a radiation image storage panel of the invention comprising a support and a phosphor layer was prepared.

EXAMPLES 2 TO 9

The procedures of Example 1 were repeated except that the Eu/Cs molar ratio in the evaporation source of powdery CsBr and EuBr$_m$ mixture, the $O_2$ partial pressure in the atmosphere and the deposition rate were changed into the values set forth in Table 1. Thus, radiation image storage panels of the invention were produced. The $O_2$ partial pressure in the atmosphere was adjusted by using a gaseous mixture containing oxygen at different levels, and the deposition rate was controlled by adjusting the electric current supplied to the resistance heater.

Comparison Examples 1 and 2

The procedures of Example 1 were repeated except that the molar ratio of Eu/Cs in the evaporation source of powdery CsBr and EuBr$_m$ mixture, the partial pressure of $O_2$ in the atmosphere and the deposition rate were changed into the values set forth in Table 1. Thus, radiation image storage panels for comparison were produced.

[Evaluation of Radiation Image Storage Panel]

The afterglow of stimulated emission given off by each prepared radiation image storage panel was evaluated in the following manner. Each radiation image storage panel was encased in a room light-shielding cassette and then exposed to X-rays (voltage: 80 kvp, current: 400 mA). The storage panel was taken out of the cassette and excited with a laser beam (wavelength: 633 nm), and sequentially the emitted stimulated emission was detected in terms of time-course by a photomultiplier. The detected stimulated emission intensity was plotted on the vertical axis while the elapsed time was on the horizontal axis. Form the plotted data, the ratio ($10^x$) of the intensity of afterglow emitted 0.24 ms after the excitation based on the maximum intensity of stimulated emission was obtained.

Separately, the phosphor layer of each radiation image storage panel was exposed to ultraviolet light (wavelength: 345 nm), and thereby emitted spontaneous emission spectrum was observed. From the obtained spectrum, the ratio I(440/490) between the intensities of emission peaks at approx. 440 nm and at approx. 490 nm was obtained.

Figure 2:
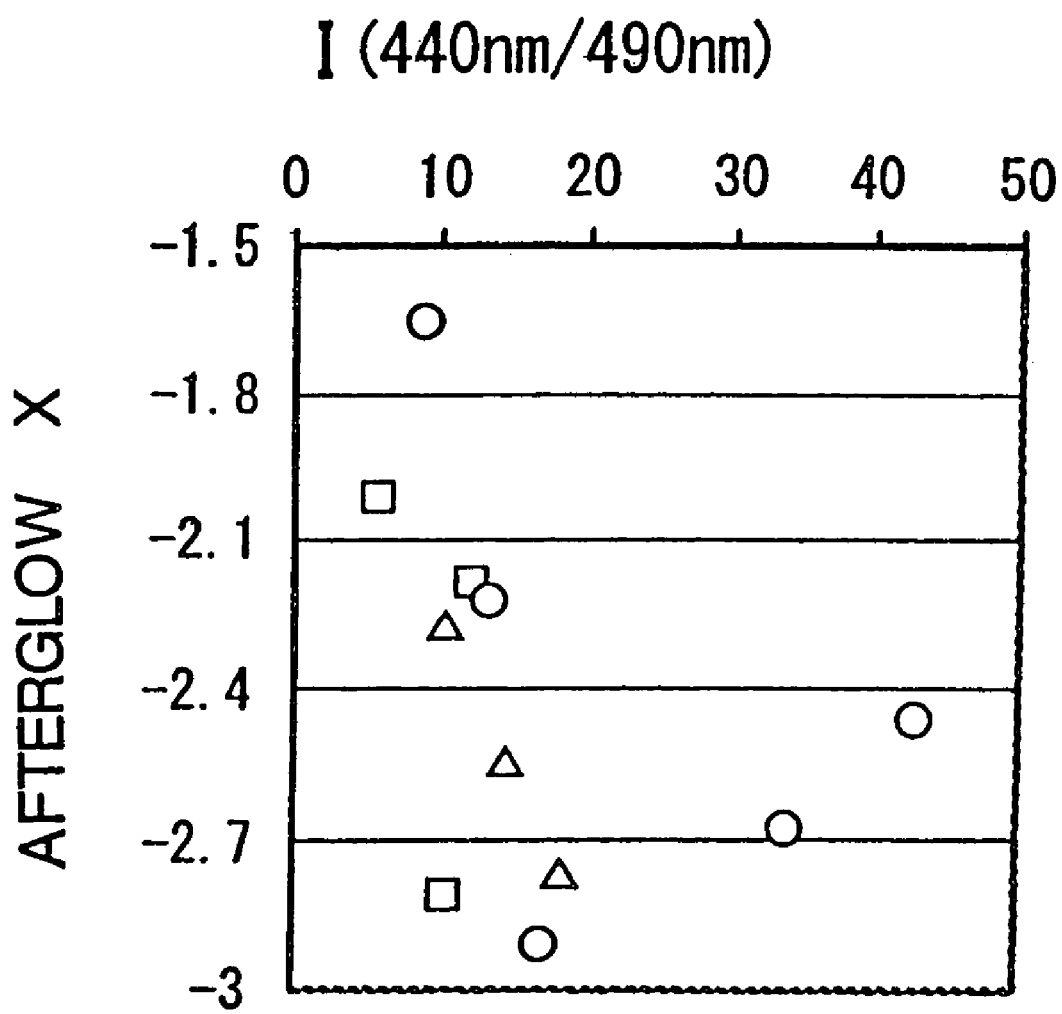
FIG. 2 is a graph showing a relation between the emission intensity ratio I(440/490) and the afterglow x of stimulated emission.

The results are shown in Table 1 and FIGS. 1 and 2.

TABLE 1

| Ex. | Eu/Cs in evaporation source | $O_2$ partial pressure (Pa) | Deposition rate (μm/min.) | Eu/Cs in phosphor layer |
|---|---|---|---|---|
| Ex. 1 | $1.0 \times 10^{-1}$ | $2.8 \times 10^{-2}$ | 5.1 | $1.18 \times 10^{-3}$ |
| Ex. 2 | $1.0 \times 10^{-2}$ | $2.8 \times 10^{-2}$ | 4.2 | $2.15 \times 10^{-4}$ |
| Ex. 3 | $1.0 \times 10^{-3}$ | $2.8 \times 10^{-2}$ | 8.9 | $2.98 \times 10^{-5}$ |
| Ex. 4 | $1.0 \times 10^{-1}$ | $2.0 \times 10^{-3}$ | 5.3 | $7.45 \times 10^{-4}$ |
| Ex. 5 | $1.0 \times 10^{-2}$ | $2.0 \times 10^{-3}$ | 6.4 | $1.23 \times 10^{-4}$ |
| Ex. 6 | $1.0 \times 10^{-3}$ | $2.0 \times 10^{-3}$ | 4.8 | $4.26 \times 10^{-5}$ |
| Ex. 7 | $1.0 \times 10^{-1}$ | $2.2 \times 10^{-4}$ | 3.4 | $2.26 \times 10^{-3}$ |
| Ex. 8 | $1.0 \times 10^{-2}$ | $2.2 \times 10^{-4}$ | 4.2 | $1.31 \times 10^{-4}$ |
| Ex. 9 | $1.0 \times 10^{-1}$ | $4.6 \times 10^{-5}$ | 4.6 | $5.49 \times 10^{-4}$ |
| Com. 1 | $1.0 \times 10^{-3}$ | $2.2 \times 10^{-4}$ | 1.7 | $6.66 \times 10^{-5}$ |
| Com. 2 | $1.0 \times 10^{-3}$ | $4.6 \times 10^{-5}$ | 7.3 | $2.19 \times 10^{-5}$ |

| Example | I(440/490) | Afterglow x |
|---|---|---|
| Example 1 | 34 | −2.68 |
| Example 2 | 17.5 | −2.91 |
| Example 3 | 13.4 | −2.22 |
| Example 4 | 18.6 | −2.77 |
| Example 5 | 14.8 | −2.54 |
| Example 6 | 10.8 | −2.27 |
| Example 7 | 10.9 | −2.81 |
| Example 8 | 12.3 | −2.18 |
| Example 9 | 42.8 | −2.46 |
| Com. Example 1 | 6 | −2.01 |
| Com. Example 2 | 8.9 | −1.65 |

FIG. 1 shows an ultraviolet light excited-emission spectrum given by a phosphor layer in a radiation image storage panel of the invention (Example 1).

FIG. 2 is a graph showing a relation between the emission intensity ratio I(440/490) and the afterglow x of stimulated emission.

The results shown in Table 1 and FIG. 2 clearly indicate that each of the radiation image storage panels of the invention (Examples 1 to 9) showed preferred afterglow of stimulated emission, namely, each panel gave off stimulated emission whose afterglow of 0.24 millisecond after excited with the stimulating ray had an intensity of $\frac{1}{10}^{2.1}$ or less based on the intensity of the stimulated emission. In particular, the storage panel giving the ratio I(440/490) in the range of 14 or more (panel of Example 1, 2, 4 or 5) showed the afterglow in a remarkably reduced intensity, namely, in an intensity of $\frac{1}{10}^{2.5}$ or less based on the intensity of the stimulated emission.

What is claimed is:

1. A radiation image storage panel comprising a phosphor layer formed by a gas phase-deposition method, wherein the phosphor layer comprises an europium activated alkali metal halide stimulable phosphor in which the alkali metal atom is selected from the group consisting of Rb and Cs and the halogen is selected from the group consisting of Cl, Br and I, and wherein the phosphor layer gives off a stimulated emission whose afterglow at 0.24 millisecond observed after excitation with a stimulating light has an intensity of $\frac{1}{10}^{2.1}$ or less of a maximum intensity of the stimulated emission, the stimulated emission and afterglow being observed after the phosphor layer is exposed to radiation and then excited with the stimulating light.

2. The radiation image storage panel of claim 1, wherein the afterglow of 0.24 millisecond after theexcitation has an intensity of $\frac{1}{10}^{2.5}$ or less of the maximum intensity of the stimulated emission.

3. The radiation image storage panel of claim 1, wherein the phosphor layer comprises columnar crystals of the europium activated alkali metal halide stimulable phosphor.

4. The radiation image storage panel of claim 1, wherein the phosphor layer gives an ultraviolet light-excited emission spectrum in which a ratio of intensities of emission peaks observed in the vicinity of 440 nm and in the vicinity of 490 nm in terms of I(440/490) satisfies the condition of:

I(440/490)≧10.

5. The radiation image storage panel of claim 4, wherein the phosphor layer gives an ultraviolet light-excited emission spectrum in which the ratio I(440/490) satisfies the condition of:

I(440/490)≧14.

6. The radiation image storage panel of claim 1, wherein the europium activated alkali metal halide stimulable phosphor is represented by the following formula (I):

$$M^{I}X \cdot aM^{II}X'_2 \cdot bM^{III}X''_3 : zEu \quad (1)$$

[in which $M^1$ is at least one alkali metal selected from the group consisting of Rb and Cs; $M^{II}$ is at least one alkaline earth metal or divalent metal selected from the group consisting of Be, Mg, Ca, Sr, Ba, Ni, Cu, Zn, and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga, and In; each of X, X' and X" independently is at least one halogen selected from the group consisting of Cl, Br and I; and a, b and z are numbers satisfying the conditions of 0a≦<0.5, 0≦b<0.5 and 1×$10^{-5}$≦z<1.0].

7. The radiation image storage panel of claim 6, wherein $M^I$ and X in the formula (I) are Cs and Br, respectively.

* * * * *